(12) United States Patent
Takahashi et al.

(10) Patent No.: US 11,662,629 B2
(45) Date of Patent: May 30, 2023

(54) LIQUID CRYSTAL LIGHT CONTROL DEVICE, AND METHOD OF MANUFACTURING LIQUID CRYSTAL LIGHT CONTROL DEVICE

(71) Applicant: SONY GROUP CORPORATION, Tokyo (JP)

(72) Inventors: Toyokazu Takahashi, Tokyo (JP); Shinya Ootani, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/439,547

(22) PCT Filed: Feb. 4, 2020

(86) PCT No.: PCT/JP2020/004047
§ 371 (c)(1),
(2) Date: Sep. 15, 2021

(87) PCT Pub. No.: WO2020/195177
PCT Pub. Date: Oct. 1, 2020

(65) Prior Publication Data
US 2022/0155624 A1 May 19, 2022

(30) Foreign Application Priority Data
Mar. 26, 2019 (JP) .............................. JP2019-057877

(51) Int. Cl.
*G02F 1/1341* (2006.01)
*G02F 1/1333* (2006.01)
(Continued)

(52) U.S. Cl.
CPC .......... *G02F 1/1341* (2013.01); *G02F 1/1339* (2013.01); *G02F 1/1347* (2013.01); *G02F 1/13725* (2013.01); *G02F 1/133302* (2021.01)

(58) Field of Classification Search
CPC .................................................... G02F 1/3141
See application file for complete search history.

(56) References Cited

U.S. PATENT DOCUMENTS

| 2003/0123017 A1* | 7/2003 | Kim .................. G02F 1/133512 349/153 |
| 2004/0114085 A1 | 6/2004 | Shiu et al. |
| 2010/0157215 A1* | 6/2010 | Kurosaki .............. G02F 1/1341 349/115 |

FOREIGN PATENT DOCUMENTS

| JP | 2004-198923 A | 7/2004 |
| JP | 2006-030838 A | 2/2006 |

(Continued)

OTHER PUBLICATIONS

International Search Report and Written Opinion of PCT Application No. PCT/JP2020/004047, dated Mar. 17, 2020, 08 pages of ISRWO.

*Primary Examiner* — Edmond C Lau
(74) *Attorney, Agent, or Firm* — Chip Law Group

(57) ABSTRACT

Liquid crystal is prevented from leaking out into a terminal hole in a liquid crystal injection process, and the productivity of a liquid crystal light control device is improved. A liquid crystal light control device according to the present technology includes a plurality of liquid crystal layers, terminals provided for respective electrodes disposed to face each other across the liquid crystal layers, and terminal holes formed above the terminals, and an injection mark of a liquid crystal for the liquid crystal layer is formed on a back face side which is a face on a side opposite to a face that has been opened by the terminal hole.

8 Claims, 11 Drawing Sheets

(51) Int. Cl.
      *G02F 1/1339*     (2006.01)
      *G02F 1/1347*     (2006.01)
      *G02F 1/137*      (2006.01)

(56) References Cited

FOREIGN PATENT DOCUMENTS

| | | |
|---|---|---|
| JP | 2011-175104 A | 9/2011 |
| JP | 2017-054030 A | 3/2017 |

* cited by examiner

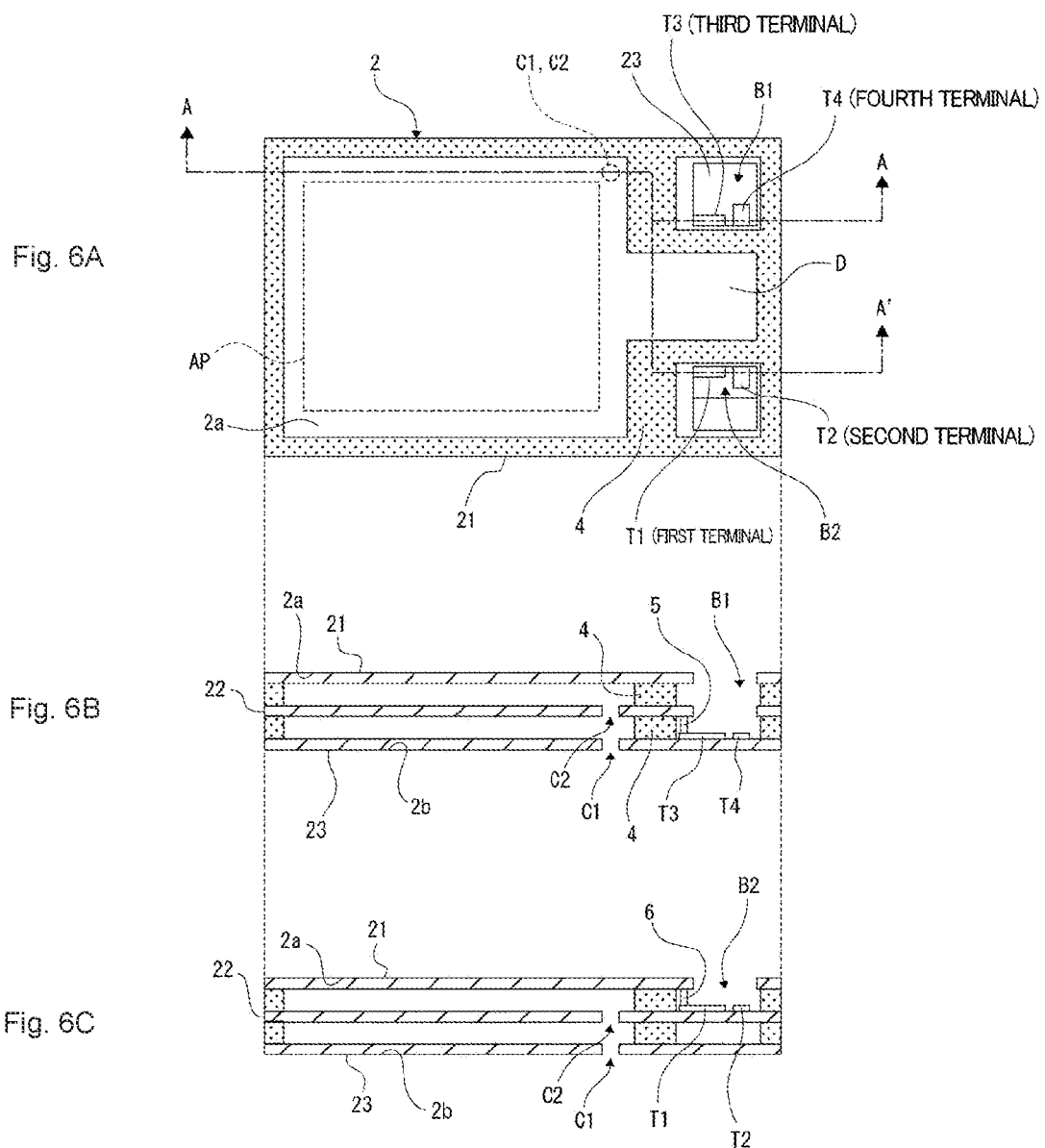

LIQUID CRYSTAL LIGHT CONTROL DEVICE, AND METHOD OF MANUFACTURING LIQUID CRYSTAL LIGHT CONTROL DEVICE

CROSS REFERENCE TO RELATED APPLICATIONS

This application is a U.S. National Phase of International Patent Application No. PCT/JP2020/004047 filed on Feb. 4, 2020, which claims priority benefit of Japanese Patent Application No. JP 2019-057877 filed in the Japan Patent Office on Mar. 26, 2019. Each of the above-referenced applications is hereby incorporated herein by reference in its entirety.

TECHNICAL FIELD

The present technology relates to a liquid crystal light control device capable of being used as, for example, a Neutral Density (ND) filter or the like and a method of manufacturing the same.

BACKGROUND ART

An imaging device that has been widely used as a digital still camera, a video camera, or the like includes a lens and an imaging element provided on an optical axis of the lens. Further, in an imaging device, as disclosed in, for example, PTL 1 to be described below, a liquid crystal light control device is provided between a lens and an imaging element. It is possible to adjust the amount of light directed from the lens to the imaging element by the liquid crystal light control device.

In PTL 1 to be described below, a liquid crystal light control device based on a two-layered structure including two liquid crystal layers is disclosed as a liquid crystal light control device.

In addition, the liquid crystal light control device is configured to include a plate-like liquid crystal panel including a liquid crystal layer, a terminal formed on a liquid crystal panel side, and a connector portion constituted by, for example, a flexible substrate for performing electrical connection, but electrical connection of the connector portion to the liquid crystal panel is performed from only one face side of the liquid crystal panel in consideration of advantages of a manufacturing process. Specifically, in the liquid crystal panel, a terminal hole is formed only on one face side, a terminal on a liquid crystal panel side is disposed within the terminal hole, and a terminal on a connector portion side is electrically connected to a terminal on the liquid crystal panel side through the terminal hole.

Meanwhile, the terminal hole is formed by performing a punching process on a glass substrate constituting the liquid crystal panel.

CITATION LIST

Patent Literature

[PTL 1]
JP 2017-54030 A

SUMMARY

Technical Problem

In a liquid crystal light control device, a liquid crystal injection process for forming a liquid crystal layer is a process of injecting liquid crystal through an injection port formed in a liquid crystal panel front body in advance before the injection of the liquid crystal. Specifically, the liquid crystal injection process is a process of injecting liquid crystal through the injection port from a liquid crystal drop placed on a predetermined jig.

Although the injection port for liquid crystal is formed by a punching process for a glass substrate constituting the liquid crystal panel similar to the above-described terminal hole, the punching process for the glass substrate has a high degree of difficulty and leads to high costs. Thus, in order to reduce the number of glass substrates requiring a punching process, an injection port of the related art is formed in a glass substrate in which a terminal hole is formed. In other words, the injection port is formed on a face on a side where the terminal hole is formed in a liquid crystal panel.

The injection port is blocked by an adhesive or the like after the liquid crystal is injected, but an injection mark affects the panel transmitting light. Thus, the formation position thereof has to be the vicinity of an end in an in-plane direction in the liquid crystal panel, and accordingly, the formation position of the injection port tends to be close to the formation position of the terminal hole.

Here, in a case where a configuration in which a liquid crystal layer as disclosed in PTL 1 described above includes a plurality of layers is adopted for a liquid crystal light control device, the number of electrodes is higher as compared to the case of a single-layered structure, which leads to an increase in the number of terminal holes described above. As described above, in a case where a terminal hole is formed only on one face side in consideration of advantages in a manufacturing process, the number of terminal holes per one face increases. In a case where an injection port is formed on the same face side as the terminal hole, it is difficult to keep the injection port away from the terminal hole. Further, in a case where a liquid crystal layer is configured as a plurality of layers, the amount of liquid crystal to be injected is increased, and thus the size of a liquid crystal drop to be used for injection is also increased. From these factors, in a case where an injection port is formed on the same face as a terminal hole in a configuration in which a liquid crystal layer is configured as a plurality of layers, liquid crystal is likely to leak out into the terminal hole. That is, a distance between the liquid crystal drop and the terminal hole is likely to be reduced, and thus liquid crystal is likely to leak out into the terminal hole.

In a case where liquid crystal leaks into the terminal hole, it is not possible to inject a necessary amount of liquid crystal, and thus the liquid crystal layer cannot be formed appropriately. That is, this results in a process error.

Further, in recent years, it has been also conceived to adopt a configuration in which a plurality of liquid crystal cells are provided in a plane for a liquid crystal light control device, and brightness can be individually adjusted for each liquid crystal cell.

However, an increase in the number of liquid crystal cells leads to an increase in the number of terminal holes, and an injection port is formed in each of the liquid crystal cells, which also results in an increase in the number of injection ports. Thus, the density of holes to be formed increases, and it is difficult to dispose an injection port away from a terminal hole. That is, in a case where the injection port is formed on the same face side as the terminal hole, liquid crystal is likely to leak out into the terminal hole.

The present technology is contrived in view of the above-described circumstances, and an object thereof is to prevent liquid crystal from leaking out into a terminal hole in a liquid crystal injection process and to improve the productivity of a liquid crystal light control device.

Solution to Problem

A liquid crystal light control device according to the present technology includes a plurality of liquid crystal layers, terminals provided for respective electrodes disposed to face each other via the liquid crystal layers, and terminal holes formed above the terminals, and an injection mark of liquid crystal for the liquid crystal layer is formed on a back face side which is a face on a side opposite to a face that has been opened by the terminal hole.

Thereby, in the liquid crystal injection process, liquid crystal is injected through the injection port that opens on a face on a side opposite to the terminal hole.

In the above-described liquid crystal light control device according to the present technology, it is conceivable that an injection mark of liquid crystal as an interlayer injection mark is formed between adjacent liquid crystal layers.

Thereby, in the liquid crystal injection process, liquid crystal injected from the back face side injection port which is an injection port formed on the back face side is injected not only into the liquid crystal layer adjacent to the back face side injection port but also into the liquid crystal layer on the inward side thereof through the injection port formed between layers.

In the above-described liquid crystal light control device according to the present technology, it is conceivable that a formation position of a back face side injection mark which is the injection mark formed on the back face side and a formation position of the interlayer injection mark overlap each other in an in-plane direction. Thereby, in the liquid crystal injection process, liquid crystal injected from the back face side injection port is injected into the liquid crystal layer on the inner side through the interlayer injection port that overlaps the back face side injection port in the in-plane direction.

In the above-described liquid crystal light control device according to the present technology, it is conceivable that central positions of the back face side injection mark and the interlayer injection mark overlap each other in an in-plane direction. Thereby, in the liquid crystal injection process, liquid crystal injected from the back face side injection port is injected into the liquid crystal layer on the inner side through the interlayer injection port that overlaps the back face side injection port at the central position thereof in the in-plane direction.

In the above-described liquid crystal light control device according to the present technology, it is conceivable that the injection mark formed on the back face side and the interlayer injection mark are formed by blocking an injection port of liquid crystal formed on the back face side and an interlayer injection port formed between the adjacent liquid crystal layers with the same plug.

Thereby, it is possible to block the injection ports by one injection of the plug.

In the above-described liquid crystal light control device according to the present technology, it is conceivable that a liquid crystal-filled region is surrounded by a sealing material in an in-plane direction in each of the liquid crystal layers, and a formation position of the injection mark in an in-plane direction is a position further inside than a formation region of the sealing material and outside an effective light control region.

Thereby, it is possible to prevent light control variations caused by the injection mark from occurring in light having passed through the effective light control region.

In the above-described liquid crystal light control device according to the present technology, it is conceivable that the liquid crystal layers are formed between three glass substrates, and the back face side injection mark which is the injection mark formed on the back face side and the interlayer injection mark are respectively formed in the separate glass substrates.

Thereby, when a liquid crystal panel having a two-layered structure including two liquid crystal layers is realized, it is possible to better facilitate a device creating process than in a case where a liquid crystal panel having a single-layered structure is bonded. Further, it is possible to reduce the number of glass substrates required for a punching process.

In the above-described liquid crystal light control device according to the present technology, it is conceivable that the liquid crystal layer is formed of guest-host type liquid crystal.

Thereby, it is possible to achieve a high contrast.

A method of manufacturing a liquid crystal light control device according to the present technology includes injecting liquid crystal into a liquid crystal panel front body from an injection port formed on a back face side which is a side of a face opposite to a face that opens by terminal holes, the liquid crystal panel front body including a plurality of liquid crystal injection layers into which liquid crystal is injected, terminals provided for respective electrodes disposed to face each other through the liquid crystal injection layers, and the terminal holes formed above the terminals.

That is, in the liquid crystal injection process, liquid crystal is injected through the injection port that opens in a face opposite to the terminal holes.

In the method of manufacturing a liquid crystal light control device according to the present technology, it is conceivable that an interlayer injection port is formed between the adjacent liquid crystal injection layers, and liquid crystal is injected from the injection port formed on the back face side into the liquid crystal panel front body in which the interlayer injection port is formed.

Thereby, liquid crystal injected from the back face side injection port which is an injection port formed on the back face side is injected not only into the liquid crystal layer adjacent to the back face side injection port but also into the liquid crystal layer on the inner side through the interlayer injection port.

In the method of manufacturing a liquid crystal light control device according to the present technology, it is conceivable that, after the liquid crystal is injected, the injection port formed on the back face side and the interlayer injection port are blocked with the same plug.

Thereby, it is possible to block the injection ports by one injection of the plug.

In the method of manufacturing a liquid crystal light control device according to the present technology, it is conceivable that the injection port which is common to a plurality of the liquid crystal panel front bodies is formed before separation, and liquid crystal is injected from the injection port.

Thereby, the number of locations for performing a punching process for forming an injection port is reduced.

In the method of manufacturing a liquid crystal light control device according to the present technology, it is conceivable that liquid crystal is injected by bringing a tip end portion of a liquid crystal drop on which surface tension has acted into contact with the injection port.

Thereby, when liquid crystal is injected, the liquid crystal is not likely to leak out of the injection port.

BRIEF DESCRIPTION OF DRAWINGS

FIGS. 6A, 6B, and 6C are diagrams showing a configuration example of the liquid crystal panel included in the liquid crystal light control device according to the embodiment.

FIG. 7 is a diagram showing an example of structures of an upper substrate, an intermediate substrate, and a lower substrate which are included in the liquid crystal panel in the embodiment.

FIGS. 8A and 8B are diagrams showing a cross-sectional structure of the liquid crystal panel after liquid crystal is filled in.

DESCRIPTION OF EMBODIMENTS

Hereinafter, embodiments according to the present technology will be described in the following order.
<1. Example of external appearance of liquid crystal light control device>
<2. Example of application to imaging device>
<3. Configuration example of liquid crystal light control device>
<4. Example of manufacturing method>
<5. Modification examples>
<6. Conclusion of embodiment>
<7. Present technology>

1. Example of External Appearance of Liquid Crystal Light Control Device

Figure 1:
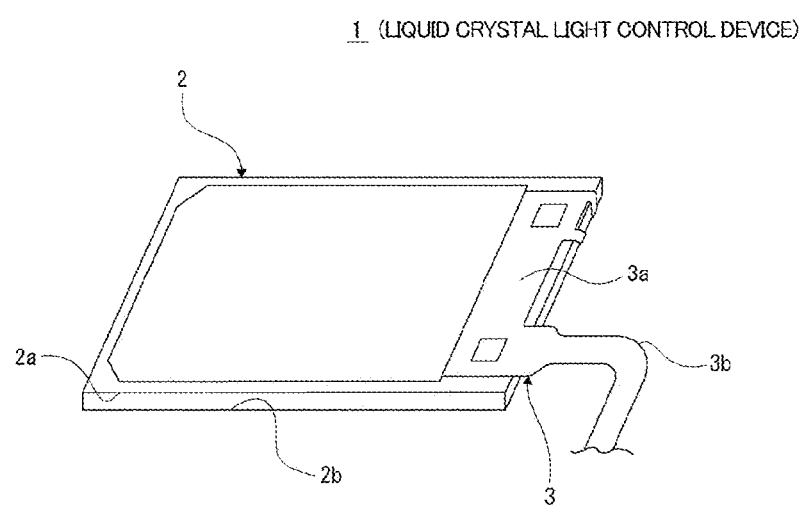
FIG. 1 is a perspective view showing a configuration example of a schematic external appearance of a liquid crystal light control device according to an embodiment.
Figure 2:
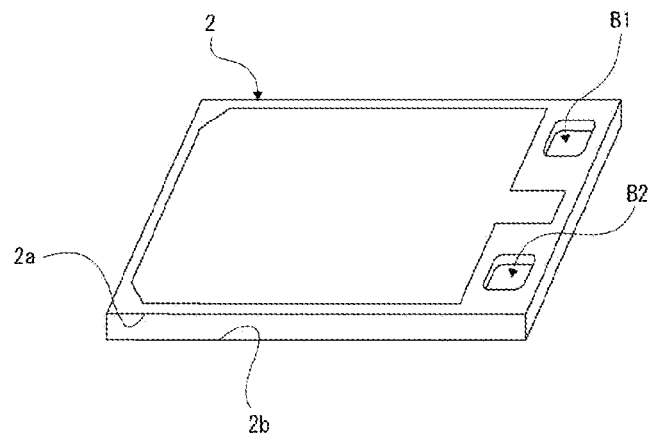
FIG. 2 is a perspective view showing a configuration example of a schematic external appearance of a liquid crystal panel included in the liquid crystal light control device according to the embodiment.

FIG. 1 is a perspective view showing a configuration example of a schematic external appearance of a liquid crystal light control element 1 as an embodiment of a liquid crystal light control device according to the present technology, and FIG. 2 is a perspective view showing a configuration example of a schematic external appearance of a liquid crystal panel 2 included in the liquid crystal light control element 1.

The liquid crystal light control element 1 includes the liquid crystal panel 2 including a liquid crystal layer filled with liquid crystal, and a connector with cables 3 for supplying an electrical signal for applying a voltage to the liquid crystal layer to the liquid crystal panel 2 (see FIG. 1).

In the liquid crystal panel 2, a terminal hole B1 and a terminal hole B2 are formed in an end in an in-plane direction (see FIG. 2). The terminal holes B1 and B2 are formed on one face side out of two faces of the liquid crystal panel 2 which are orthogonal to the thickness direction thereof. Here, hereinafter, a face on a side where the terminal holes B1 and B2 are formed will be referred to as a front face 2a of the liquid crystal light control element 1. Further, in the liquid crystal light control element 1, a face on a side opposite to the front face 2a will be referred to as a back face 2b.

Although not shown in FIG. 2, terminals for respective electrodes disposed to face each other through the liquid crystal layer are disposed on the inner sides of the terminal holes B1 and B2 (that is, on a side of the back face 2b). As will be described later, in the present example, the liquid crystal panel 2 includes a plurality of liquid crystal layers, and thus a total number of electrodes is four or more, and a total number of terminals is four or more. Specifically, in the present example, the number of liquid crystal layers is two (a first liquid crystal layer 7 and a second liquid crystal layer 8 to be described later: see FIGS. 8A and 8B), and four electrodes, that is, two electrodes as counter electrodes for one liquid crystal layer and two electrodes as counter electrodes for the other liquid crystal layer are formed. Accordingly, four terminals are formed (a first electrode E1 to a fourth electrode E4 and a first terminal T1 to a fourth terminal T4 to be described later: see FIG. 7). In the present example, two of the four terminals are disposed in the terminal hole B1, and the other two of the four terminals are disposed in the terminal hole B2.

The connector with cables 3 includes a connector portion 3a in which a terminal electrically connected to a terminal on the liquid crystal panel 2 side is formed, and a cable portion 3b including a wiring electrically connected to the terminal in the connector portion 3a. In the present example, the connector with cables 3 is configured such that the connector portion 3a and the cable portion 3b are integrally constituted by a flexible substrate.

The connector with cables 3 is attached to the liquid crystal panel 2 by a method such as compression so that the terminal in the connector portion 3a is electrically connected to the terminal on the liquid crystal panel 2 side through the terminal holes B1 and B2.

The terminal holes B1 and B2 are formed only on one face side of the liquid crystal panel 2, and thus it is possible to perform the attachment of the connector with cables 3 (connector portion 3a) only on one face side of the liquid crystal panel 2 and facilitate the attachment process of the connector with cables 3 (the attachment process becomes complicated in a case where the terminal holes B1 and B2 are respectively formed on the front and back face sides).

In the liquid crystal light control element 1 of the present example, a GH liquid crystal (guest-host type liquid crystal) is used for each of two liquid crystal layers. In the present example, a cross-nicole arrangement is applied to liquid crystal orientation between two liquid crystal layers, thereby improving an image quality when the liquid crystal light control element is applied to an imaging device.

2. Example of Application to Imaging Device

An example of application of the liquid crystal light control element 1 to an imaging device will be described with reference to FIGS. 3, 4, 5A, and 5B.

Figure 3:
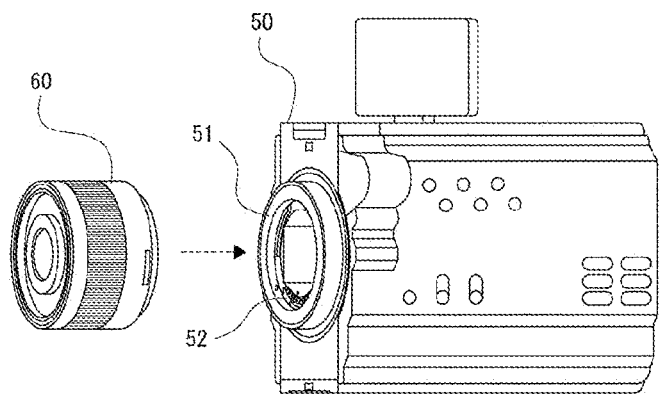
FIG. 3 is a diagram showing an imaging device to which the liquid crystal light control device according to the embodiment is applied, and an example of an interchangeable lens which is detachably mounted on the imaging device.

FIG. 3 shows an imaging device 50 and a lens barrel 60 as one of interchangeable lenses capable of being detachably mounted on the imaging device 50. The external shapes of the imaging device 50 and the lens barrel 60 shown in the drawing are just examples. As one of types of the present embodiment, an interchangeable lens type video camera or a digital still camera is assumed.

As shown in the drawing, a mount portion 51 for the lens barrel 60 is formed in the imaging device 50, and the imaging device 50 is configured such that the lens barrel 60 is detachably mounted through the mount portion 51. In addition, a terminal portion 52 is formed in the mount portion 51. An electrical contact contacting each electrical contact of the terminal portion 52 is provided in the lens barrel 60 corresponding to the imaging device 50 in a state where the lens barrel 60 is mounted on the imaging device 50, and a transmission path for various electrical signals between the imaging device 50 and the lens barrel 60 is formed by the contact state.

Figure 4A:
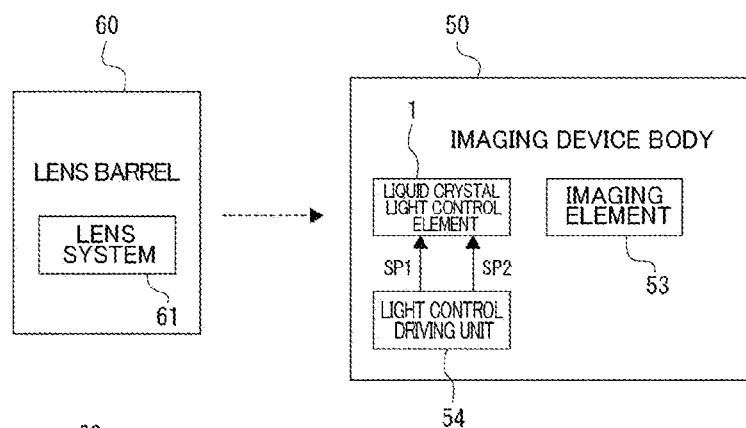
FIGS. 4A and 4B are diagrams showing an example in which the liquid crystal light control device according to the embodiment is applied to the imaging device.

FIG. 4A schematically shows a light control driving unit 54, driving the liquid crystal light control element 1, an imaging element 53, and the liquid crystal light control element 1, which is disposed inside a camera body of the imaging device 50. The light control driving unit 54 controls the transmittance of each liquid crystal layer by applying liquid crystal driving signals SP1 and SP2 to the liquid crystal layers in the liquid crystal light control element 1. The imaging element 53 is configured as, for example, a charge coupled device (CCD) type, a complementary metal oxide semiconductor (CMOS) type, or the like.

A lens system 61 constituted by optical components such as a plurality of lenses including a zoom lens and a focus lens is provided on the lens barrel 60 side.

In the configuration example of FIG. 4A, when the lens barrel 60 is mounted on the imaging device 50, light incident through the lens system 61 is controlled by the liquid crystal light control element 1 on the imaging device 50 side and received by the imaging element 53.

Figure 4B:
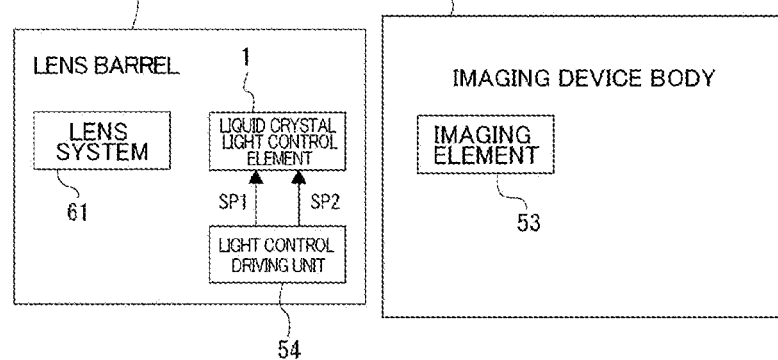

FIG. 4B shows an example in which the lens system 61, the liquid crystal light control element 1, and the light control driving unit 54 are disposed on the lens barrel 60 side, and the imaging element 53 is disposed on the body side of the imaging device 50.

Also in this case, when the lens barrel 60 is mounted on the imaging device 50, light incident through the lens system 61 is controlled by the liquid crystal light control element 1 and received by the imaging element 53.

Figure 5A:
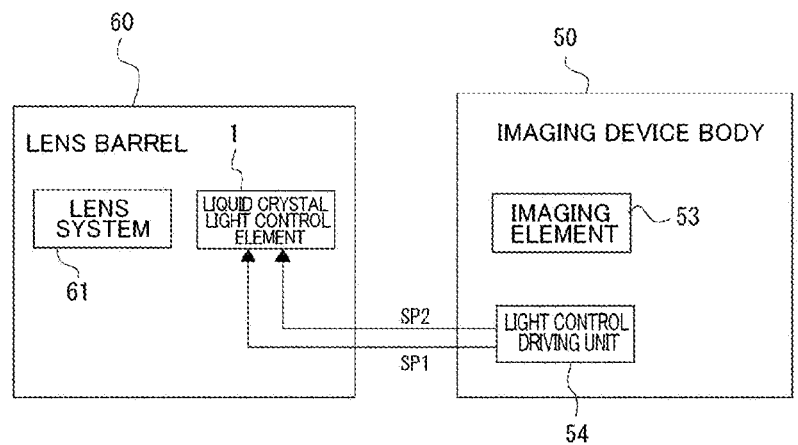
FIGS. 5A and 5B are diagrams showing another example in which the liquid crystal light control device according to the embodiment is applied to the imaging device.

FIG. 5A shows an example in which the lens system 61 and the liquid crystal light control element 1 are disposed on the lens barrel 60 side, and the imaging element 53 and the light control driving unit 54 are disposed on the body side of the imaging device 50. This is a configuration in which the liquid crystal driving signals SP1 and SP2 from the light control driving unit 54 are supplied to the liquid crystal light control element 1 by the lens barrel 60 being mounted on the imaging device 50.

Figure 5B:
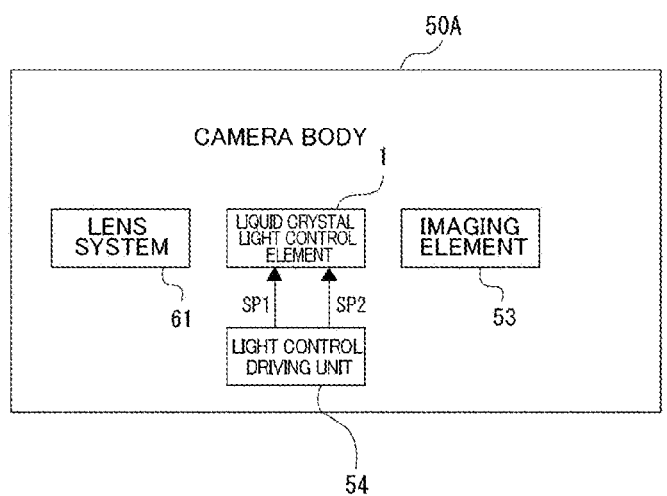

FIG. 5B shows the case of an integrated lens type imaging device 50A which is not an interchangeable lens type, and such an integrated lens type imaging device 50A is also one of types of the present embodiment.

As a matter of course, in this case, the lens system 61, the liquid crystal light control element 1, the imaging element 53, and the light control driving unit 54 are all disposed inside the body of the imaging device 50A.

3. Configuration Example of Liquid Crystal Light Control Device

A configuration example of the liquid crystal light control element 1 will be described with reference to FIGS. 6A, 6B, 6C, 7, 8A, and 8B.

FIGS. 6A, 6B, and 6C are diagrams showing a configuration example of the liquid crystal panel 2 included in the liquid crystal light control element 1. Specifically, FIG. 6A is a schematic top view of the liquid crystal panel 2, FIG. 6B is a schematic cross-sectional view of the liquid crystal panel 2 when the liquid crystal panel 2 is cut along line A-A shown in FIG. 6A, and FIG. 6C is a schematic cross-sectional view of the liquid crystal panel 2 when the liquid crystal panel 2 is cut along line A-A' shown in FIG. 6A. Meanwhile, a state before liquid crystal is filled is shown in FIGS. 6B and 6C for convenience of description.

Figures 8A, 8B:
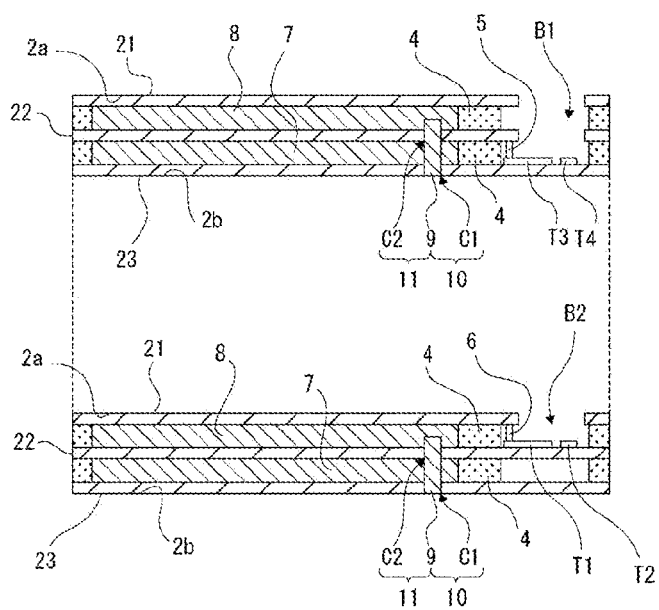

In addition, FIG. 7 is a diagram showing an example of structures of an upper substrate 21, an intermediate substrate 22, and a lower substrate 23 included in the liquid crystal panel 2, FIGS. 8A and 8B are diagrams showing a cross-sectional structure of the liquid crystal panel 2 after liquid crystal is filled, FIG. 8A is a schematic cross-sectional view of the liquid crystal panel 2 when the liquid crystal panel 2 is cut along line A-A shown in FIG. 6A, and FIG. 8B is a schematic cross-sectional view of the liquid crystal panel 2 when the liquid crystal panel 2 is cut along line A-A' shown in FIG. 6A.

The liquid crystal panel 2 includes the upper substrate 21, the intermediate substrate 22, and the lower substrate 23 as glass substrates for dividing the liquid crystal layer (see FIGS. 6B and 6C). The upper substrate 21 is a glass substrate disposed on a side closest to the front face 2a in the liquid crystal panel 2, and the lower substrate 23 is a glass substrate disposed on a side closest to the back face 2b in the liquid crystal panel 2. The intermediate substrate 22 is a glass substrate disposed between the upper substrate 21 and the lower substrate 23.

Bonding between the upper substrate 21 and the intermediate substrate 22 and bonding between the intermediate substrate 22 and the lower substrate 23 are formed using sealing materials 4 (see FIGS. 6B and 6C). An adhesive such as an epoxy adhesive or an acrylic adhesive is used for the sealing materials 4.

In the present example, the sealing materials 4 are formed in a region except for the formation region of the terminal hole B1, the formation region of the terminal hole B2, and a region to be filled with liquid crystal in an in-plane direction (see FIG. 6A). The sealing material 4 also functions as a wall portion surrounding a region filled with liquid crystal in the in-plane direction. Here, the liquid crystal-filled region surrounded by the sealing material 4 can be referred to as a "liquid crystal injection layer" into which liquid crystal is injected.

In the in-plane direction, an effective light control region AP is defined within a liquid crystal-filled region surrounded by the sealing material 4 (FIG. 6A). The effective light control region AP is a region that guarantees an effective operation of light control and is defined as a region narrower than the entire liquid crystal-filled region.

The terminal hole B1 penetrates the upper substrate 21 and the intermediate substrate 22, and a third terminal T3 and a fourth terminal T4 are disposed on the inner side of the terminal hole B1 (see FIGS. 6B and 6A). Specifically, the third terminal T3 and the fourth terminal T4 are formed on the front face of the lower substrate 23, and the terminal hole B1 is formed above the third terminal T3 and the fourth terminal T4.

The terminal hole B2 penetrates only the upper substrate 21, and the first terminal T1 and the second terminal T2 are disposed on the inner side of the terminal hole B2 (see FIGS. 6C and 6A). Specifically, the first terminal T1 and the second terminal T2 are formed on the front face of the intermediate substrate 22, and the terminal hole B2 is formed above the first terminal T1 and the second terminal T2.

As illustrated in FIG. 7, the first terminal T1 is a terminal corresponding to the first electrode E1 formed on the back face side of the upper substrate 21 (in FIG. 7, the upper substrate 21 is disposed on the lower side of the paper), and the second terminal T2 is a terminal corresponding to the second electrode E2 formed on the front face side of the intermediate substrate 22. The second terminal T2 is a terminal formed as a portion of the second electrode E2 formed on the same front face side of the intermediate substrate 22, but a gap in the thickness direction (the thickness direction of the liquid crystal panel 2) is provided between the first electrode E1 formed in the upper substrate 21 and the first terminal T1 formed in the intermediate substrate 22. For this reason, a silver point 6 that electrically connects the first terminal T1 and the first electrode E1 to each other is provided between the upper substrate 21 and the intermediate substrate 22 (see FIGS. 6C and 7).

In addition, the third terminal T3 is a terminal corresponding to the third electrode E3 formed on the back face side of the intermediate substrate 22, and the fourth terminal T4 is a terminal corresponding to the fourth electrode E4 formed on the front face side of the lower substrate 23 (see FIG. 6B FIG. 7).

The fourth terminal T4 is formed as a portion of the fourth electrode E4 formed on the same front face side of the lower substrate 23, but a gap in the thickness direction is provided between the third terminal T3 formed in the lower substrate 23 and the third electrode E3 formed in the intermediate substrate 22. Thus, a silver point 5 that electrically connects the third terminal T3 and the third electrode E3 to each other is provided between the intermediate substrate 22 and the lower substrate 23 (see FIGS. 6B and 7).

For example, carbon having conductivity, or the like is used for the silver points 5 and 6.

Here, as can be understood with reference to FIGS. 6A, 6B, 6C, and 7, the terminal hole B1 formed above the third terminal T3 and the fourth terminal T4 is formed by an upper hole B11 formed in the upper substrate 21 and a lower hole B12 formed in the intermediate substrate 22.

In addition, FIG. 7 shows a rubbing direction of oriented films (not shown) respectively formed on the back face side of the upper substrate 21, on the front face side and the back face side of the intermediate substrate 22, and on the front face side of the lower substrate 23 by a double line arrow, and accordingly, liquid crystal orientation becomes a cross-nicole relationship between the two liquid crystal layers.

A liquid crystal injection port C1 for injecting liquid crystal into the liquid crystal-filled region surrounded by the sealing material 4 is formed in the lower substrate 23 (see FIG. 7). Further, an interlayer injection port C2 for injecting liquid crystal injected from the liquid crystal injection port C1 into a liquid crystal-filled region between the upper substrate 21 and the intermediate substrate 22 is formed in the intermediate substrate 22. The liquid crystal injection port C1 penetrates the lower substrate 23, and the interlayer injection port C2 penetrates the intermediate substrate 22. In the present example, the liquid crystal injection port C1 and the interlayer injection port C2 are formed to have the same shape and the same size, and the formation positions thereof overlap each other in the in-plane direction. Specifically, in the present example, the centers of the liquid crystal injection port C1 and the interlayer injection port C2 overlap each other in the in-plane direction. The positions of the liquid crystal injection port C1 and the interlayer injection port C2 in the in-plane direction, particularly, the central positions thereof overlap each other, and thus liquid crystal injected from the liquid crystal injection port C1 is likely to be injected into the liquid crystal layer on the inner side through the interlayer injection port C2, thereby making it possible to achieve a reduction in a period of time required for a liquid crystal injection process.

Further, in the present example, the formation positions of the liquid crystal injection port C1 and the interlayer injection port C2 in the in-plane direction are positions further inside than the formation region of the sealing material 4 and outside the effective light control region AP (see FIG. 7A).

Thereby, it is possible to prevent light control variations caused by a liquid crystal injection mark (a liquid crystal injection mark 10 and an interlayer injection mark 11 to be described later) from occurring in light having passed through the effective light control region AP.

Here, in the present embodiment, it can be said that the liquid crystal injection port C1 formed to penetrate the lower substrate 23 as described above is formed on the back face 2b side opposite to a side of a face that has been opened by the terminal holes B1 and B2.

The liquid crystal injection port C1 is formed on the back face 2b side in this manner, and thus it is possible to prevent liquid crystal from leaking out into the terminal hole B1 or the terminal hole B2 in the liquid crystal injection process and improve the productivity of the liquid crystal light control element 1.

Liquid crystal is filled in the liquid crystal-filled region between the lower substrate 23 and the intermediate substrate 22 and the liquid crystal-filled region between the upper substrate 21 and the intermediate substrate 22 by the injection of liquid crystal through the liquid crystal injection port C1, and the first liquid crystal layer 7 (between the lower substrate 23 and the intermediate substrate 22) and the second liquid crystal layer 8 (between the upper substrate 21 and the intermediate substrate 22) are formed as illustrated in FIGS. 8A and 8B.

After liquid crystal is filled, the liquid crystal injection port C1 and the interlayer injection port C2 are blocked by a plug 9, and liquid crystal is sealed. As will be described later, in the present example, an adhesive is injected from the liquid crystal injection port C1 after filling with liquid crystal is completed, and the liquid crystal injection port C1 and the interlayer injection port C2 are blocked. That is, in the present example, the liquid crystal injection port C1 and the interlayer injection port C2 are blocked by the same plug 9.

Here, after the blocking with the plug 9 is performed, the liquid crystal injection mark 10 and the interlayer injection mark 11 are formed by the liquid crystal injection port C1, the interlayer injection port C2, and the plug 9. The liquid crystal injection mark 10 is a portion in which the liquid crystal injection port C1 is blocked with the plug 9, and similarly, the interlayer injection mark 11 is a portion in which the interlayer injection port C2 is blocked with the plug 9.

Meanwhile, in the present example, the liquid crystal-filled region surrounded by the sealing material 4 has a region protruding between the terminal hole B1 and the terminal hole B2 in the in-plane direction (hereinafter, this region will be referred to as a "protrusion region D") as indicated by "D" in FIG. 7A. In the in-plane direction, the first electrode E1, the second electrode E2, the third electrode E3, and the fourth electrode E4 extend into the protrusion region D, and a set of the first electrode E1 and the second electrode E2 and a set of the third electrode E3 and the fourth electrode E4 are driven on the basis of the above-described liquid crystal driving signals SP1 and SP2 after the filling with liquid crystal is completed, whereby the liquid crystal orientation of the protrusion region D is controlled similar to the effective light control region AP.

The protrusion region D is used as a monitoring region for optical density.

Specifically, in the present example, a sensor for detecting optical density is mounted on the above-described connector portion 3a, and the protrusion region D is configured such that the sensor and the position thereof in the in-plane direction overlap each other when the connector portion 3a is attached as shown in FIG. 1.

4. Example of Manufacturing Method

An example of a method of manufacturing the liquid crystal light control element 1 will be described with reference to FIGS. 9A, 9B, 9C, 9D, 9E, 9F, 10A, 10B, 10C, and 11.

FIGS. 9A, 9B, 9C, 9D, 9E, 9F, 10A, 10B, and 10C are diagrams showing an example of a manufacturing process for the liquid crystal light control element 1.

In the present example, an example of a manufacturing process of separating the liquid crystal panels 2 from the base materials of the plurality of liquid crystal panels 2 will be described. In the manufacture of the liquid crystal panel 2, a total of three glass substrates, that is, an upper substrate base material 21' which is a base material of the upper substrate 21, an intermediate substrate base material 22' which is a base material of the intermediate substrate 22, and a lower substrate base material 23' which is a base material of the lower substrate 23 are prepared.

Figures 9A, 9B, 9C, 9D, 9E, 9F:
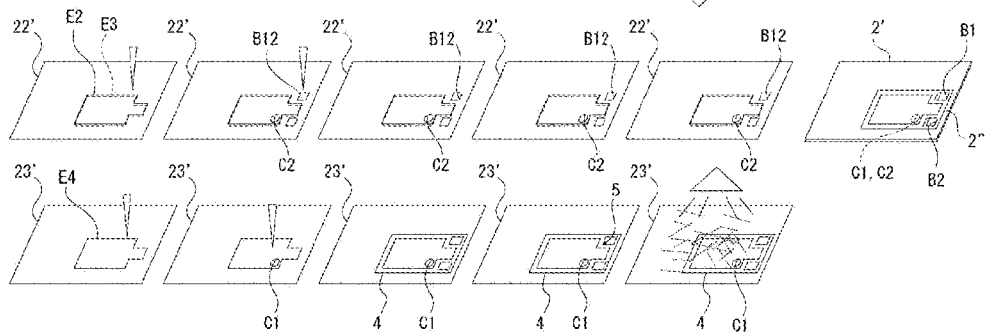
FIGS. 9A, 9B, 9C, 9D, 9E, and 9F are diagrams showing an example of a manufacturing process for the liquid crystal light control device according to the embodiment.

In an electrode forming process shown in FIG. 9A, first, corresponding electrodes among the first electrode E1 to fourth electrode E4 are formed in the upper substrate base material 21', the intermediate substrate base material 22', and the lower substrate base material 23'. Specifically, the first electrode E1 is formed on the back face of the upper substrate base material 21', the second electrode E2 and the third electrode E3 are respectively formed on the front face and the back face of the intermediate substrate base material 22', and the fourth electrode E4 is formed on the front face of the lower substrate base material 23'. Here, the formation of the first electrode E1 to fourth electrode E4 in the present example is performed, for example, by patterning a transparent conductive film formed of indium tin oxide (ITO) by a laser.

Meanwhile, processes to be described below including the electrode forming process shown in FIG. 9A are performed on a plurality of locations corresponding to the number of liquid crystal panels 2 to be separated with respect to one base material, but only a processed portion of one liquid crystal panel 2 with respect to the base material is shown in FIGS. 9A, 9B, 9C, 9D, 9E, 9F, 10A, 10B, and 10C due to the circumstances of illustration.

Subsequently, the formation of the upper hole B11 and the terminal hole B2 in the upper substrate base material 21', the formation of the lower hole B12 and the interlayer injection port C2 in the intermediate substrate base material 22', and the formation of the liquid crystal injection port C1 in the lower substrate base material 23' are performed by a punching process shown in FIG. 9B. The formation of the upper hole B11, the terminal hole B2, the lower hole B12, the interlayer injection port C2, and the liquid crystal injection port C1 is performed by a punching process using a laser in the present example.

Subsequently, the sealing material 4 is formed on the back face side of the upper substrate base material 21' and the front face side of the lower substrate base material 23' by a seal forming process shown in FIG. 9C. In the present example, the formation of the sealing material 4 is performed by screen printing. A thermosetting resin such as epoxies is used for the sealing material 4.

Subsequently, the formation of the silver point 6 on the back face side of the upper substrate base material 21' and the formation of the silver point 5 on the front face side of the lower substrate base material 23' are performed by a silver point forming process shown in FIG. 9D. Although not shown in FIG. 9D in detail, the silver point 6 is formed by applying a conductive material (for example, conductive carbon) to the first electrode E1 formed on the back face of the upper substrate base material 21' in the present example, and the silver point 5 is formed by applying a similar conductive material to the third terminal T3 formed on the front face of the lower substrate base material 23'.

Subsequently, glass balls as interlayer spacers are scattered on the back face side of the upper substrate base material 21' and the front face side of the lower substrate base material 23' by a spacer scattering process shown in FIG. 9E. In the present example, a liquid (for example, ethanol) including glass balls having a diameter of, for example, 7 µm is scattered by a spray method or the like.

After the scattering process shown in FIG. 9E is performed, the upper substrate base material 21', the intermediate substrate base material 22', and the lower substrate base material 23' are bonded using the sealing material 4 by a bonding process shown in FIG. 9F. Since a thermosetting resin is used as the sealing material 4 in the present example, the bonding process is performed by heating and pressing the upper substrate base material 21', the intermediate substrate base material 22', and the lower substrate base material 23' after positioning.

By the bonding process, the liquid crystal panel 2, referred to as a "liquid crystal panel front body 2"" in the drawing, which is not filled with liquid crystal and not separated is formed.

By the bonding process in FIG. 9E, a structure in which a plurality of liquid crystal panel front bodies 2" are arrayed is obtained, but the structure will be referred to as a "liquid crystal panel base body 2"'" below.

Figure 10A:
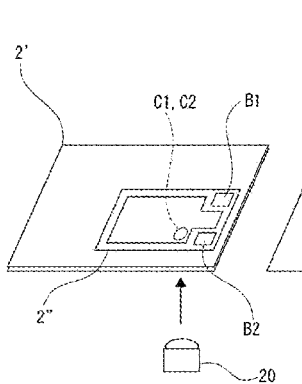
FIGS. 10A, 10B, and 10C are diagrams showing an example of a manufacturing process for the liquid crystal light control device according to the embodiment together with FIGS. 9A, 9B, 9C, 9D, 9E, and 9F.

After the bonding process in FIG. 9E is performed, liquid crystal is injected from the liquid crystal injection port C1 into the liquid crystal panel front bodies 2" in the liquid crystal panel base body 2' by an injection process shown in FIG. 10A. In the present example, liquid crystal is injected using a liquid crystal drop LC disposed on a predetermined jig 20 as shown in a schematic diagram of FIG. 11. Specifically, in the present example, liquid crystal is injected by bringing a tip end portion of the liquid crystal drop LC disposed on the jig 20 and having surface tension acting thereon into contact with the liquid crystal injection port C1. In this case, the injection of liquid crystal is performed using a capillary phenomenon. Liquid crystal injected from the liquid crystal injection port C1 is filled not only in an inner region of the sealing material 4 (liquid crystal-filled region) formed between the lower substrate base material 23' and the intermediate substrate base material 22' but also in an inner region of the sealing material 4 (liquid crystal-filled region) formed between the intermediate substrate base material 22' and the upper substrate base material 21' through the interlayer injection port C2.

Here, as described above, liquid crystal is injected by bringing the tip end portion of the liquid crystal drop LC on which surface tension has acted into contact with the liquid crystal injection port C1, and thus the liquid crystal is not likely to leak out of the liquid crystal injection port C1, thereby improving utilization efficiency of the liquid crystal.

The injection process in the present example is performed on the liquid crystal panel base body 2' disposed inside a vacuumized chamber. In addition, the jig 20 and the liquid crystal drop LC in the present example are prepared for each liquid crystal panel front body 2" formed in the liquid crystal panel base body 2', and liquid crystal is simultaneously injected into the liquid crystal panel front bodies 2" in parallel. Meanwhile, a required period of time from the start of injection of liquid crystal to the filling of the layers with liquid crystal is, for example, approximately 10 minutes to 20 minutes.

Although description based on the drawings will be omitted, the liquid crystal injection port C1 and the interlayer injection port C2 are blocked with the plug 9 mentioned above after the filling with liquid crystal is completed. Specifically, in the present example, liquid crystal is suctioned from the liquid crystal injection port C1 in a state where liquid crystal filled by heating the liquid crystal panel base body 2' is expanded, and an adhesive formed of, for example, an ultraviolet curing resin as the plug 9 is injected into a gap formed due to the suction from the liquid crystal injection port C1. Thereafter, the filled liquid crystal is cooled, and the injected adhesive is drawn into the interlayer injection port C2. As a result, the liquid crystal injection port C1 and the interlayer injection port C2 are blocked with the plug 9, and liquid crystal is sealed.

Figure 10B:
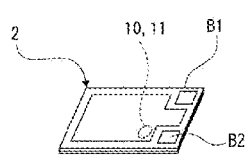

After the injection process shown in FIG. 10A (the sealing process using the plug 9 is also included) is performed, the liquid crystal panel front body 2" after the filling with liquid crystal (that is, after the formation of the first liquid crystal layer 7 and the second liquid crystal layer 8), that is, the liquid crystal panel 2 is separated from the liquid crystal panel base material 2' by a separation process shown in FIG. 10B. The separation is performed by cutting using a dicing saw or the like. Subsequently, the connector with cables 3 is attached to the separated liquid crystal panel 2 by an attachment process shown in FIG. 10C. In the present example, an anisotropic conductive film (ACF) is used for the attachment of the connector with cables 3. Specifically, after the ACF is temporarily attached to the connector 3a constituted by a flexible substrate, the connector portion 3a is heated and compressed into the liquid crystal panel 2 with an ACF attachment surface facing the electrodes (the first electrode E1 to the fourth electrode E4) of the liquid crystal panel 2.

Figure 10C:
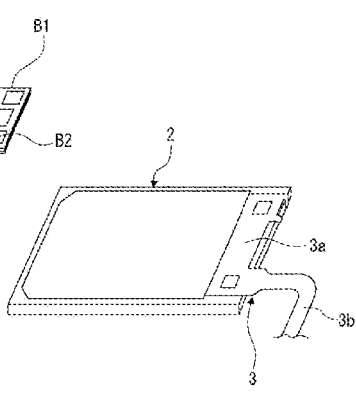
Figure 9:
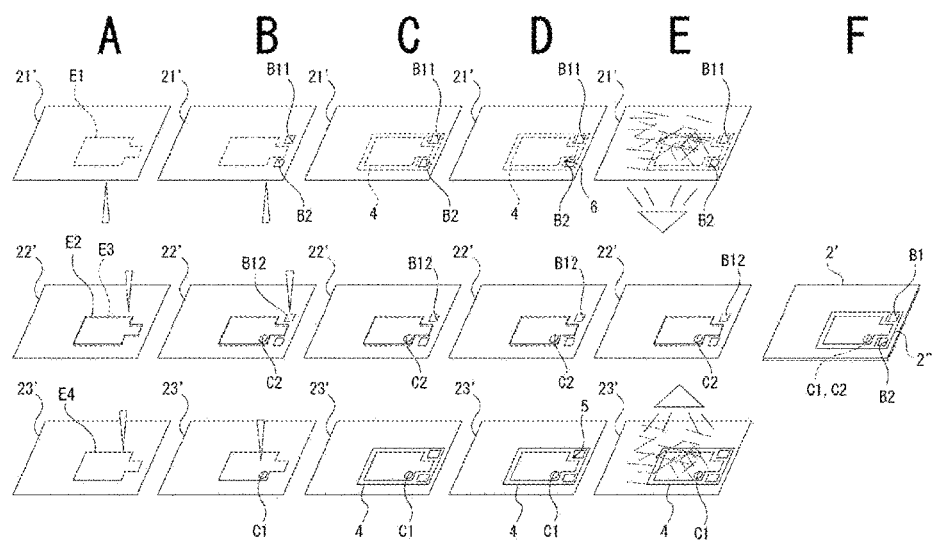
Figure 10:
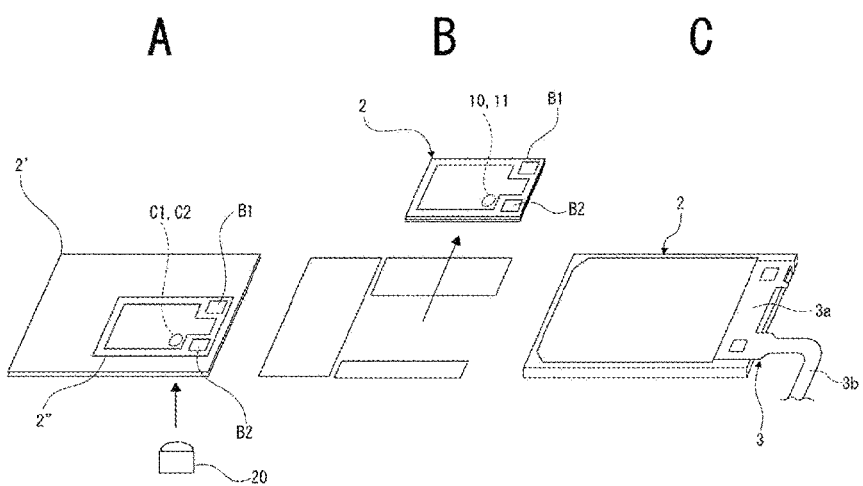
Figure 11:
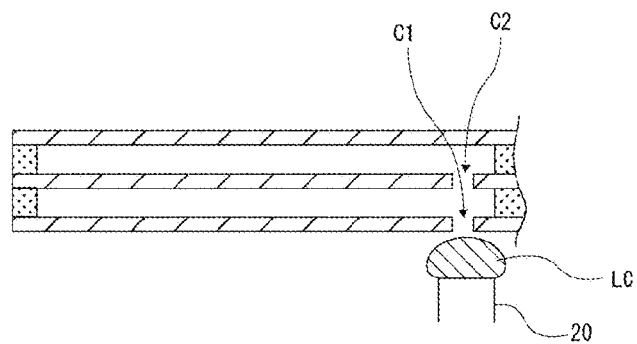

The attachment process shown in FIG. 10C is performed, and thus the liquid crystal light control element 1 shown in FIG. 1 is completed.

5. Modification Examples

Meanwhile, the embodiment is not limited to the specific examples described above, and various modification examples can be considered.

For example, a case where a single liquid crystal cell is provided has been illustrated above, but a configuration in which a plurality of liquid crystal cells are formed in the in-plane direction can also be adopted. In this case, it is conceivable that a liquid crystal injection port C1 and an interlayer injection layer C2 are formed for each liquid crystal cell. Meanwhile, in this case, in the liquid crystal light control device, the liquid crystal injection mark 10 is formed for each liquid crystal cell.

In addition, an example in which the liquid crystal injection port C1 is formed for each liquid crystal panel front body 2" has been described so far. However, for example, as shown in FIG. 12, in the liquid crystal panel base material 2', a liquid crystal injection port C1 which is common to the plurality of liquid crystal panel front bodies 2" is formed, and liquid crystal can also be injected from the liquid crystal injection port C1.

Figure 12:
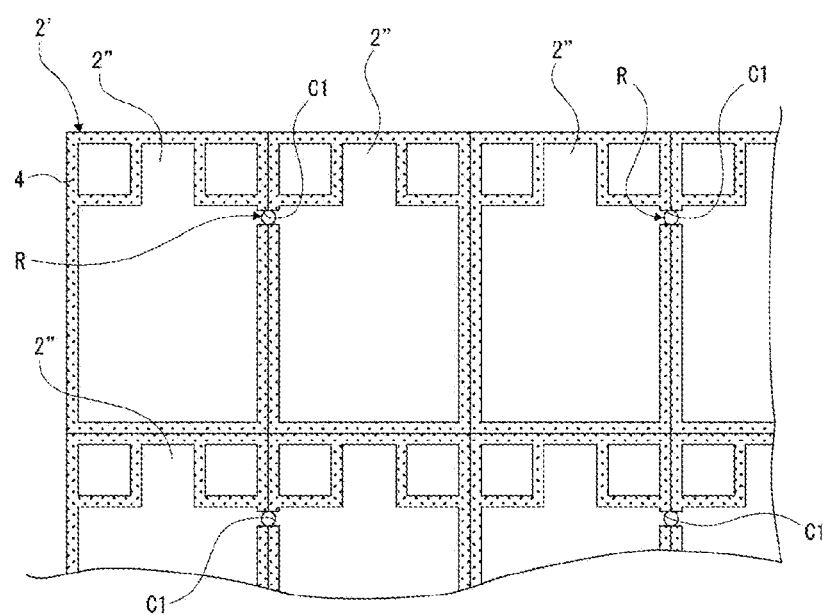

In the example shown in FIG. 12, one liquid crystal injection port C1 which is common to the liquid crystal panel front bodies 2" is formed at a boundary portion between the liquid crystal panel front bodies 2" adjacent to each other. In this case, in the liquid crystal panel front bodies 2", an introduction passage R is formed as a portion in which the sealing material 4 is not formed, with respect to a portion overlapping the formation portion of the common liquid crystal injection port C1 in the in-plane direction, and liquid crystal injected from the common liquid crystal injection port C1 is guided to the liquid crystal-filled regions (regions surrounded by the sealing material 4) of the liquid crystal panel front bodies 2" by the introduction passage R.

Meanwhile, although not shown in the drawing, the interlayer injection layer C2 is formed to be common to the liquid crystal panel front bodies 2" which are adjacent to each other and in association with the introduction passage R, similar to the common liquid crystal injection port C1 mentioned above.

6. Conclusion of Embodiment

As described above, a liquid crystal light control device (the liquid crystal light control element 1) according to an embodiment includes a plurality of liquid crystal layers (the first liquid crystal layer 7 and the second liquid crystal layer 8), terminals (the first terminal T1 to the fourth terminal T4) provided for respective electrodes disposed to face each other via the liquid crystal layers, and terminal holes (the terminal holds B1 and B2) formed above the terminals, and is configured such that an injection mark (the liquid crystal injection mark 10) of liquid crystal for the liquid crystal layer is formed on a back face (the back face 2b) side opposite to a side of a face that has been opened by the terminal holes.

Thereby, in the liquid crystal injection process, liquid crystal is injected through the injection port that opens on a face on a side opposite to the terminal hole.

Thus, it is possible to prevent liquid crystal from leaking out into the terminal hole in the liquid crystal injection process and to improve the productivity of the liquid crystal light control device.

Further, in the liquid crystal light control device of the embodiment, an injection mark of liquid crystal as an interlayer injection mark (the interlayer injection mark 11) is formed between adjacent liquid crystal layers.

Thereby, in the liquid crystal injection process, liquid crystal injected from the back face side injection port which is an injection port formed on the back face side is injected not only into the liquid crystal layer adjacent to the back face side injection port but also into the liquid crystal layer on the inward side thereof through the injection port formed between layers.

Thus, it is possible to form the liquid crystal layers by one injection operation and achieve the facilitation of a device creating process, the efficiency of a device creating operation, and a reduction in cost.

Further, in the liquid crystal light control device according to the embodiment, the formation position of the back face side injection mark which is an injection mark formed on the back face side and the formation position of the interlayer injection mark overlap each other in the in-plane direction.

Thereby, in the liquid crystal injection process, liquid crystal injected from the back face side injection port is injected into the liquid crystal layer on the inner side through the interlayer injection port that overlaps the back face side injection port in the in-plane direction.

The positions of the back face side injection port and the interlayer injection port in the in-plane direction overlap each other, and thus liquid crystal injected from the back face side injection port is likely to be injected into the liquid crystal layer on the inner side through the interlayer injection port, whereby it is possible to achieve a reduction in a period of time required for the liquid crystal injection process.

Further, in the liquid crystal light control device according to the embodiment, the central positions of the back face side injection mark and the interlayer injection mark overlap each other in the in-plane direction.

Thereby, in the liquid crystal injection process, liquid crystal injected from the back face side injection port is injected into the liquid crystal layer on the inner side through the interlayer injection port that overlaps the back face side injection port at the central position thereof in the in-plane direction.

The central positions of the back face side injection port and the interlayer injection port in the in-plane direction overlap each other, and thus liquid crystal injected from the back face side injection port is more likely to be injected into the liquid crystal layer on the inner side through the interlayer injection port, whereby it is possible to achieve a further reduction in a period of time required for the liquid crystal injection process.

Further, in the liquid crystal light control device according to the embodiment, the injection mark and the interlayer injection mark formed on the back face side are formed by blocking the liquid crystal injection port formed on the back face side and the interlayer injection port formed between adjacent liquid crystal layers with the same plug (the plug 9).

Thereby, it is possible to block the injection ports by one injection of the plug.

Thus, it is possible to achieve the facilitation of a device creating process, the efficiency of a device creating operation, and a reduction in cost.

Further, in the liquid crystal light control device according to the embodiment, a liquid crystal-filled region is surrounded by a sealing material (the sealing material 4) in the in-plane direction in each liquid crystal layer, and the formation position of the injection mark in the in-plane direction is a position further inside than the formation region of the sealing material and outside an effective light control region (the effective light control region AP).

Thereby, it is possible to prevent light control variations caused by the injection mark from occurring in light having passed through the effective light control region.

Thus, it is possible to improve light control performance.

Further, in the liquid crystal light control device according to the embodiment, the liquid crystal layer is formed between three glass substrates (the upper substrate 21, the intermediate substrate 22, the lower substrate 23), and the back face side injection mark which is an injection mark formed on the back face side and the interlayer injection mark are formed in separate glass substrates.

Thereby, when a liquid crystal panel having a two-layered structure including two liquid crystal layers is realized, it is possible to more facilitate a device creating process than in a case where a liquid crystal panel having a single-layered structure is bonded. Further, it is possible to reduce the number of glass substrates required for a punching process.

Thus, it is possible to achieve the efficiency of a device creating operation and a reduction in cost.

Further, in the liquid crystal light control device according to the embodiment, the liquid crystal layer is formed of guest-host type liquid crystal.

Thereby, it is possible to achieve a high contrast.

Thus, it is possible to achieve an improvement in light control performance.

In a method of manufacturing a liquid crystal light control device according to an embodiment, liquid crystal is injected into a liquid crystal panel front body (the liquid crystal panel front body 2″) from an injection port (the liquid crystal injection port C1) formed on a back face (the back face 2b) side which is a side of a face opposite to a face that opens by terminal holes (the terminal holes B1 and B2), the liquid crystal panel front body including a plurality of liquid crystal injection layers into which liquid crystal is injected, terminals (the first terminal T1 to the fourth terminal T4) provided for respective electrodes disposed to face each other through the liquid crystal injection layers, and the terminal holes formed above the terminals.

That is, in the liquid crystal injection process, liquid crystal is injected through the injection port that opens in a face opposite to the terminal holes.

Thus, it is possible to prevent liquid crystal from leaking out into the terminal hole in the liquid crystal injection process and to improve the productivity of the liquid crystal light control device.

Further, in the method of manufacturing a liquid crystal light control device according to the embodiment, an interlayer injection port (the interlayer injection port C2) is formed between the adjacent liquid crystal injection layers, and liquid crystal is injected from the injection port formed on the back face side into the liquid crystal panel front body in which the interlayer injection port is formed.

Thereby, liquid crystal injected from the back face side injection port which is an injection port formed on the back face side is injected not only into the liquid crystal layer adjacent to the back face side injection port but also into the liquid crystal layer on the inner side through the interlayer injection port.

Thus, it is possible to form the liquid crystal layers by one injection operation and achieve the facilitation of a device creating process, the efficiency of a device creating operation, and a reduction in cost.

Further, in the method of manufacturing a liquid crystal light control device according to the embodiment, after liquid crystal is injected, the injection port formed on the back face side and the interlayer injection port are blocked with the same plug (the plug 9).

Thereby, it is possible to block the injection ports by one injection of the plug.

Thus, it is possible to achieve the facilitation of a device creating process, the efficiency of a device creating operation, and a reduction in cost.

Further, in the method of manufacturing a liquid crystal light control device according to the embodiment, an injection port which is common to a plurality of liquid crystal panel front bodies is formed before separation, and liquid crystal is injected from the injection port.

Thereby, the number of locations for performing a punching process for forming an injection port is reduced.

Thus, it is possible to achieve a reduction in cost.

Further, in the method of manufacturing a liquid crystal light control device according to the embodiment, liquid crystal is injected by bringing a tip end portion of a liquid crystal drop (the liquid crystal drop LC) on which surface tension has acted into contact with an injection port.

Thereby, when liquid crystal is injected, the liquid crystal is not likely to leak out of the injection port.

Thus, it is possible to achieve an improvement in the utilization efficiency of liquid crystal and a reduction in cost.

Meanwhile, the advantages effects described in the present specification are merely exemplary and are not limited, and other effects may be obtained.

7. Present Technology

Meanwhile, the present technology can also adopt the following configurations.

(1)

A liquid crystal light control device including:

a plurality of liquid crystal layers;

terminals provided for respective electrodes disposed to face each other across the liquid crystal layers; and terminal holes formed above the terminals, wherein an injection mark of liquid crystal for the liquid crystal layer is formed on a back face side which is a face on a side opposite to a face that has been opened by the terminal holes.

(2)

The liquid crystal light control device according to (1), wherein an injection mark of liquid crystal as an interlayer injection mark is formed between adjacent liquid crystal layers.

(3)

The liquid crystal light control device according to (2), wherein a formation position of a back face side injection mark which is the injection mark formed on the back face side and a formation position of the interlayer injection mark overlap each other in an in-plane direction.

(4)

The liquid crystal light control device according to (3), wherein central positions of the back face side injection mark and the interlayer injection mark overlap each other in an in-plane direction.

(5)

The liquid crystal light control device according to any one of (2) to (4), wherein the injection mark formed on the back face side and the interlayer injection mark are formed by blocking an injection port of liquid crystal formed on the back face side and an interlayer injection port formed between the adjacent liquid crystal layers with the same plug.

(6)

The liquid crystal light control device according to any one of (1) to (5), wherein a liquid crystal-filled region is surrounded by a sealing material in an in-plane direction in each of the liquid crystal layers, and a formation position of the injection mark in an in-plane direction is a position further inside than a formation region of the sealing material and outside an effective light control region.

(7)

The liquid crystal light control device according to any one of (2) to (6), wherein the liquid crystal layers are formed between three glass substrates, and the back face side injection mark which is the injection mark formed on the back face side and the interlayer injection mark are respectively formed in the separate glass substrates.

(8)

The liquid crystal light control device according to any one of (1) to (7), wherein the liquid crystal layer is formed of guest-host type liquid crystal.

(9)

A method of manufacturing a liquid crystal light control device, the method including:

injecting liquid crystal into a liquid crystal panel front body from an injection port formed on a back face side which is a side of a face opposite to a face that opens by terminal holes, the liquid crystal panel front body including a plurality of liquid crystal injection layers into which liquid crystal is injected, terminals provided for respective electrodes disposed to face each other through the liquid crystal injection layers, and the terminal holes formed above the terminals.

(10)

The method of manufacturing a liquid crystal light control device according to (9), wherein an interlayer injection port is formed between the adjacent liquid crystal injection layers, and liquid crystal is injected from the injection port formed on the back face side into the liquid crystal panel front body in which the interlayer injection port is formed.

(11)

The method of manufacturing a liquid crystal light control device according to (10), wherein after the liquid crystal is injected, the injection port formed on the back face side and the interlayer injection port are blocked with the same plug.

(12)

The method of manufacturing a liquid crystal light control device according to any one of (9) to (11), wherein the injection port which is common to a plurality of the liquid crystal panel front bodies is formed before separation, and liquid crystal is injected from the injection port.

(13)

The method of manufacturing a liquid crystal light control device according to any one of (9) to (12), wherein liquid crystal is injected by bringing a tip end portion of a liquid crystal drop on which surface tension has acted into contact with the injection port.

REFERENCE SIGNS LIST

1 Liquid crystal light control element
2 Liquid crystal panel
2b Back face
2' Liquid crystal panel base material
2" Liquid crystal panel front body 21 Upper substrate
22 Intermediate substrate
23 Lower substrate
21' Upper substrate base material
22' Intermediate substrate base material
23' Lower substrate base material
3 Connector with cables
3a Connector portion
3b Cable portion
4 Sealing material
5, 6 Silver point
7 First liquid crystal layer
8 Second liquid crystal layer
9 Plug
10 Liquid crystal injection mark
11 Interlayer injection mark
B1, B2 Terminal hole
B11 Upper hole
B12 Lower hole
C1 Liquid crystal injection port
C2 Interlayer injection port
AP Effective light control region
D Protrusion region
E1 First electrode
E2 Second electrode
E3 Third electrode
E4 Fourth electrode
T1 First terminal
T2 Second terminal
T3 Third terminal
T4 Fourth terminal
LC Liquid crystal drop
R Introduction passage
50, 50A Imaging device

The invention claimed is:

1. A liquid crystal light control device comprising:
a plurality of liquid crystal layers;
terminals provided for respective electrodes disposed to face each other across the plurality of liquid crystal layers; and
terminal holes formed above the terminals,
wherein an injection mark of liquid crystal for a liquid crystal layer, of the plurality of liquid crystal layers, is formed on a back face side which is a face on a side opposite to a face that has been opened by the terminal holes.

2. The liquid crystal light control device according to claim 1,
wherein an injection mark of the liquid crystal as an interlayer injection mark is formed between adjacent liquid crystal layers of the plurality of liquid crystal layers.

3. The liquid crystal light control device according to claim 2,
wherein a formation position of a back face side injection mark which is the injection mark formed on the back face side and a formation position of the interlayer injection mark overlap each other in an in-plane direction.

4. The liquid crystal light control device according to claim 3,
wherein central positions of the back face side injection mark and the interlayer injection mark overlap each other in the in-plane direction.

5. The liquid crystal light control device according to claim 2,
wherein the injection mark formed on the back face side and the interlayer injection mark are formed by blocking an injection port of the liquid crystal formed on the back face side and an interlayer injection port formed between the adjacent liquid crystal layers with a same plug.

6. The liquid crystal light control device according to claim 1, wherein
a liquid crystal-filled region is surrounded by a sealing material in an in-plane direction in each of the plurality of liquid crystal layers, and
a formation position of the injection mark in the in-plane direction is a position further inside than a formation region of the sealing material and outside an effective light control region.

7. The liquid crystal light control device according to claim 2, wherein
the plurality of liquid crystal layers are formed between three glass substrates, and
a back face side injection mark which is the injection mark formed on the back face side and the interlayer injection mark are respectively formed in the separate glass substrates.

8. The liquid crystal light control device according to claim 1,
wherein the liquid crystal layer is formed of guest-host type liquid crystal.

* * * * *